United States Patent
Yu et al.

(10) Patent No.: US 9,030,922 B2
(45) Date of Patent: May 12, 2015

(54) METHOD AND APPARATUS FOR LASER CONTROL DURING RECORDING

(75) Inventors: Chih-Ching Yu, Tao-Yuan Hsien (TW); Hung-Hsiang Chang, Hsinchu County (TW); Ping-Tsai Tsai, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 1033 days.

(21) Appl. No.: 12/480,944

(22) Filed: Jun. 9, 2009

(65) Prior Publication Data

US 2009/0245051 A1 Oct. 1, 2009

Related U.S. Application Data

(63) Continuation of application No. 11/344,810, filed on Feb. 1, 2006, now Pat. No. 7,561,508.

(60) Provisional application No. 60/713,206, filed on Aug. 31, 2005.

(51) Int. Cl.
*G11B 7/00* (2006.01)
*G11B 7/1263* (2012.01)
*G11B 7/1267* (2012.01)

(52) U.S. Cl.
CPC ............ *G11B 7/1263* (2013.01); *G11B 7/1267* (2013.01)

(58) Field of Classification Search
CPC ...... G11B 7/126; G11B 7/0045; G11B 7/127; G11B 7/0032; G11B 7/1267

USPC ............... 369/47.5, 116, 47.51, 47.52, 47.53, 369/47.54, 120, 122, 44.26, 47.1, 47.28

See application file for complete search history.

(56) References Cited

U.S. PATENT DOCUMENTS

| | | | |
|---|---|---|---|
| 5,684,765 A * | 11/1997 | Matsumoto et al. | 369/13.24 |
| 6,636,468 B2 | 10/2003 | Salmonsen | |
| 6,714,502 B2 | 3/2004 | Ko | |
| 7,088,656 B2 * | 8/2006 | Narumi et al. | 369/47.53 |
| 7,450,482 B2 * | 11/2008 | Lee et al. | 369/47.53 |
| 7,616,544 B2 * | 11/2009 | Miyashita et al. | 369/47.53 |
| 2005/0243670 A1 | 11/2005 | Kakimoto et al. | |
| 2006/0013098 A1 | 1/2006 | Nobukuni | |

* cited by examiner

*Primary Examiner* — Nabil Hindi
(74) *Attorney, Agent, or Firm* — McClure, Qualey & Rodack, LLP (57) ABSTRACT

The invention relates to recording on a medium, and in particular, to laser control during recording data on an optical medium. A laser control method for dynamically adjusting laser power during recording data onto an optical disc comprises: recording normal data onto the optical disc according to an initial laser power; stopping recording when a trigger is generated; reading back the recorded normal data and generating a first recording quality index; recording a test pattern at a test pattern starting point according to a selected laser power; reading back the test pattern and generating a second recording quality index; and determining an adaptive laser power to continually record the normal data according to the first recording quality index and the second recording quality index.

20 Claims, 7 Drawing Sheets

METHOD AND APPARATUS FOR LASER CONTROL DURING RECORDING

CROSS REFERENCE TO RELATED APPLICATIONS

This application is a continuation of U.S. patent application entitled "Method and Apparatus for Laser Control During Recording," Ser. No. 11/344,810, filed on Feb. 1, 2006, which claims the benefit of U.S. provisional application Ser. No. 60/713,206, filed Aug. 31, 2005, the entirety of which are incorporated by reference herein.

BACKGROUND

The invention relates to recording on a medium, and in particular, to laser control during data recording on an optical medium.

A conventional method for laser control adjusts a laser power or a write strategy according to previously recorded data on an optical disc. This method, however, is not able to accurately adjust the required laser power or write strategy, thus recording quality suffers.

SUMMARY

An object of the invention is to provide a laser control method for dynamically adjusting laser power during recording data onto an optical disc. The laser control method comprises: recording normal data onto the optical disc according to an initial laser power; stopping recording when a trigger is generated; reading back the recorded normal data and generating a first recording quality index; recording a test pattern at a test pattern starting point according to a selected laser power; reading back the test pattern and generating a second recording quality index, and determining an adaptive laser power to continually record the normal data according to the first recording quality index and the second recording quality index.

Another object of the invention is to provide a laser control method for dynamically adjusting write pulse shape during recording data onto an optical disc. The laser control method comprises: recording normal data onto a disc according to an initial write pulse shape; stopping recording if a trigger is generated; reading back the recorded normal data and generating a first recording quality index; recording a test pattern at a test pattern starting point according to a selected write pulse shape; reading back the test pattern and generating a second recording quality index, and generating an adaptive write pulse shape continually recording the normal data according to the first recording quality index and the second recording quality index.

A further object of the invention is to provide a laser control apparatus for dynamically adjusting laser output algorithm to record data during recording normal data onto the optical disc. The laser control apparatus comprises: a pick-up head, a write laser modulating circuit and a detection circuit. The pick-up head generates laser to recording the normal data onto the optical disc according to the laser output algorithm. The detection circuit detects at least one recording quality index from the data recorded onto the optical disc. The write laser modulating circuit generates an initial laser output algorithm to the PUH to record a normal data, generates a stopping signal to stop recording when receiving a trigger from the detection unit, generates a selected laser output algorithm to the PUH to record a test pattern at a test pattern starting point on the optical disc, and generates an adaptive laser output algorithm to continually record the normal data according to a first recording quality index and a second recording quality index. The first recording quality index is detected by the detection unit by reading back the recorded normal data. The second recording quality index is detected by the detection unit by reading back the test pattern.

DESCRIPTION OF THE DRAWINGS

The following detailed description, given by way of example and not intended to limit the invention solely to the embodiments described herein, will best be understood in conjunction with the accompanying drawings, in which.

DESCRIPTION

A detailed description of the present invention is provided in the following.

Figure 1:
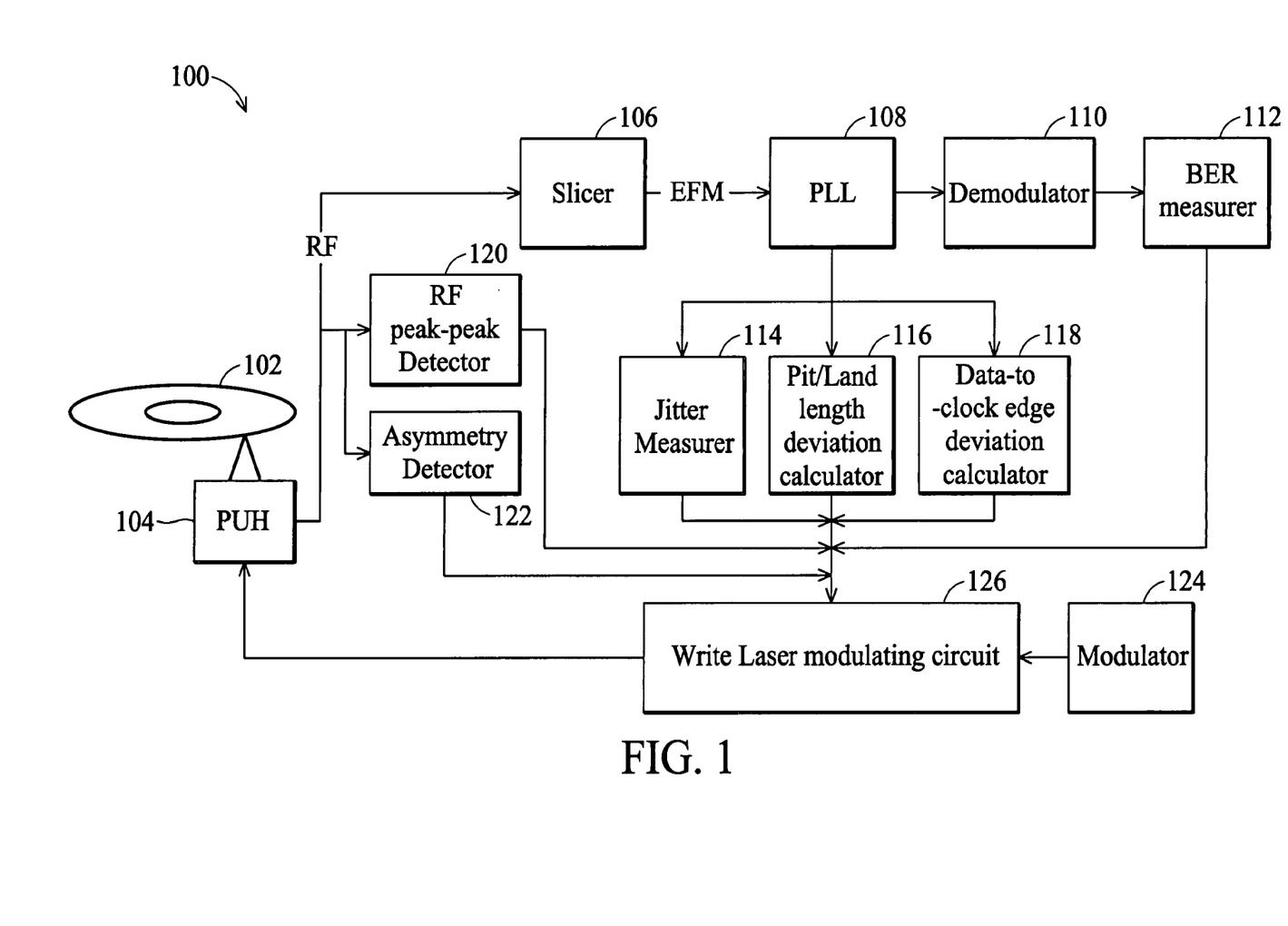
FIG. 1 is a block diagram of an optical system according to the invention.
Figure 2:
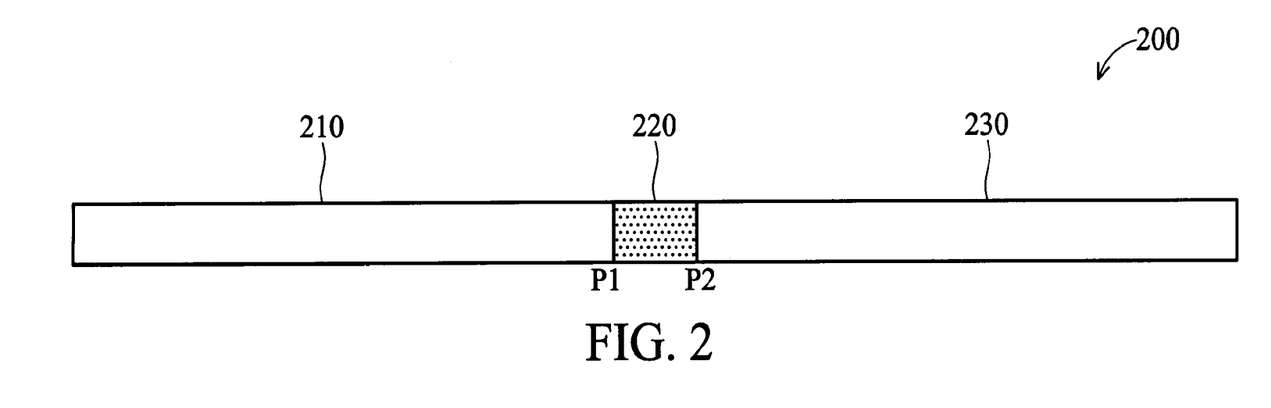
FIG. 2 is a schematic diagram of a recording data segment being recorded into the disc in FIG. 1.

A detailed description of the invention is provided in the following. Please refer to FIG. 1 and FIG. 2 at the same time. FIG. 1 is a block diagram of an optical system 100 according to an embodiment of the invention. In some embodiments, the disc 102 may be a recordable DVD disc (e.g. DVDR and DVDRW) or another type of optical medium. FIG. 2 is a schematic diagram of a recording data segment 200 being recorded onto disc 102 of FIG. 1. The optical system 100 records normal data 210 onto the disc 102, and roughly detects some writing quality index back from the recorded normal data 210 during recording. For example, the writing quality index could be the bit error rate (BER) detected from the BER measurer 112, the jitter detected from the jitter measurer 114, the pit/land length deviation detected from the pit/land length deviation calculator 116, the data-to-clock edge deviation detected from the data-to-clock edge deviation calculator 118, and the asymmetry detected from the asymmetry detector 122. When the recording quality index deteriorates, the optical system 100 generates a trigger to stop recording of the normal data 210. For example, the stopping point is the point P1 in FIG. 2. Then, the optical system 100 reads the recorded data 210 to obtain the accurate writing quality index. After that, the optical system 100 starts recording the test pattern 220 into the disc 102 from the stop point P1 to a predetermined end point P2. The test pattern 220 is recorded onto the disc 102 by another laser power or the write strategy. After recording the test pattern 220, the optical system 100 can generate a new laser power or write strategy to record the normal data 230 into the disc 102 according to the information from both the normal data 210 and the test pattern 220 or the information only from the test pattern 220. Further description of how to determine the new laser power or write strategy for recording the normal data 230 is provided in the following.

In a first embodiment, a detailed description of generating a new laser power is provided in the following. The normal data 210 is recorded to the disc 102 according to the laser power PwoA, and the test pattern 220 is recorded to the disc 102 according to another laser power PwoB. If the asymmetry read from the normal data 210 is BetaA and the asymmetry read from the test pattern 220 is BetaB, then a new laser power PwoC for recording the normal pattern 230 can be determined as follows:

$$PwoC=PwoA+[(BetaTarget-BetaA)/(BetaB-BetaA)]*(PwoB-PwoA)$$

wherein the value BetaTarget is a predetermined value. Due to the linear relationship between the laser power and the asymmetry, the new laser power PwoC can be determined from the above equation. Additionally, if the length of the test pattern 220 requires shortening, a special pattern utilizing a plurality of long marks (larger than 8T) plus a plurality of short marks (smaller than 5T) can be chosen to fill the test pattern 220. For example, if the length of test pattern 220 is specified to be two EFM frames (1 EFM frame=1488T in DVDR specification), a special pattern (11T+11T+11T+11T+4T+4T+4T+4T+4T+4T+4T+4T+4T+4T+4T+4T) is chosen to appear repeatedly in the test pattern 220 until the test pattern 220 is filled. Otherwise, if the length of the test pattern 220 is unlimited, a random pattern is acceptable.

Figure 3:
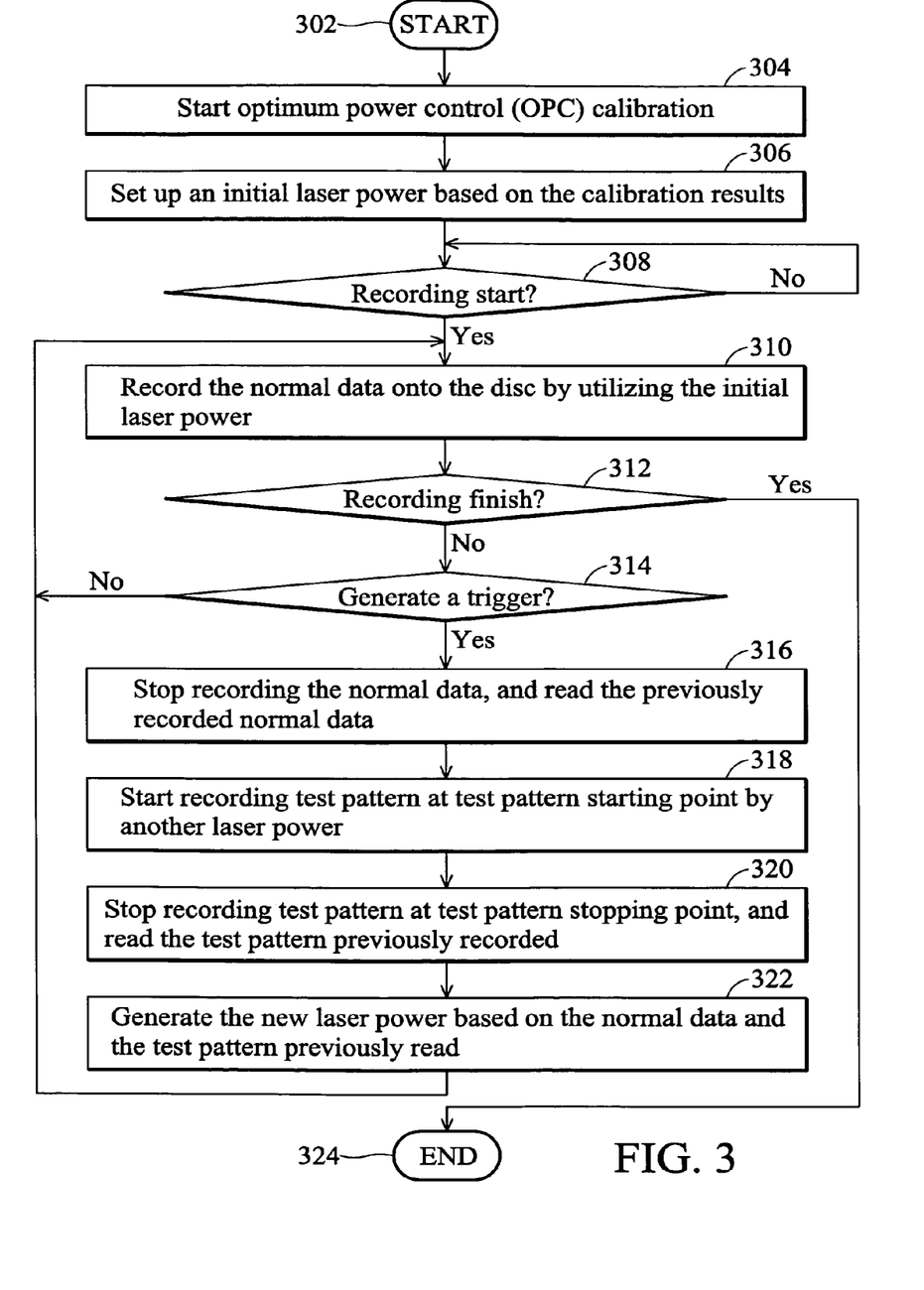
FIG. 3 is a flow chart of the laser control method according to the first embodiment of the invention.

Please refer to FIG. 3. FIG. 3 is a flow chart of the laser control method according to the first embodiment of the invention. The laser control method is applied to the optical system 100. A detailed description is given in the following.

Step 302: Start.

Step 304: Start optimum power control (OPC) calibration.

Step 306: Set up an initial laser power PwoA based on the calibration results.

Step 308: If the recording has not yet started, step 308 is repeated; otherwise, proceed to step 310.

Step 310: Record the normal data 210 onto the disc 102 by utilizing the initial laser power PwoA.

Step 312: If the recording is not finished, proceed to step 314; otherwise, go to step 324.

Step 314: Determine if the optical system 100 generates a trigger: If yes, proceed to step 316; otherwise proceed to step 310.

Step 316: Stop recording the normal data 210, and read the previously recorded normal data 210.

Step 318: Start recording test pattern 220 at test pattern starting point by another laser power PwoB.

Step 320: Stop recording test pattern 220 at test pattern stopping point, and read the test pattern 220 previously recorded.

Step 322: Generate the new laser power PwoC based on the normal data 210 and the test pattern 220 previously read.

Step 324: End.

A detailed description of the second embodiment of generating a new write strategy is provided in the following. There are various kinds of write strategies; here the write pulse shape is given as an example. The normal data 210 is recorded onto the disc 102 according to the write pulse shape WpsA, and the test pattern 220 is recorded onto the disc 102 according to another write pulse shape WpsB. The optical system 100 then determines the write pulse shape WpsC according to the test pattern 220 or/and normal data 210 previously read. For example, if the optical system 100 reads the test pattern 220 and finds it is readable (e.g. asymmetry, jitter, bit error rate, Pit/Land length deviation, or data-to-clock edge deviation is acceptable), the write pulse shape WpsC can then be equal to the write pulse shape WpsB. A detailed description of write pulse shape method is provided later.

Figure 4:
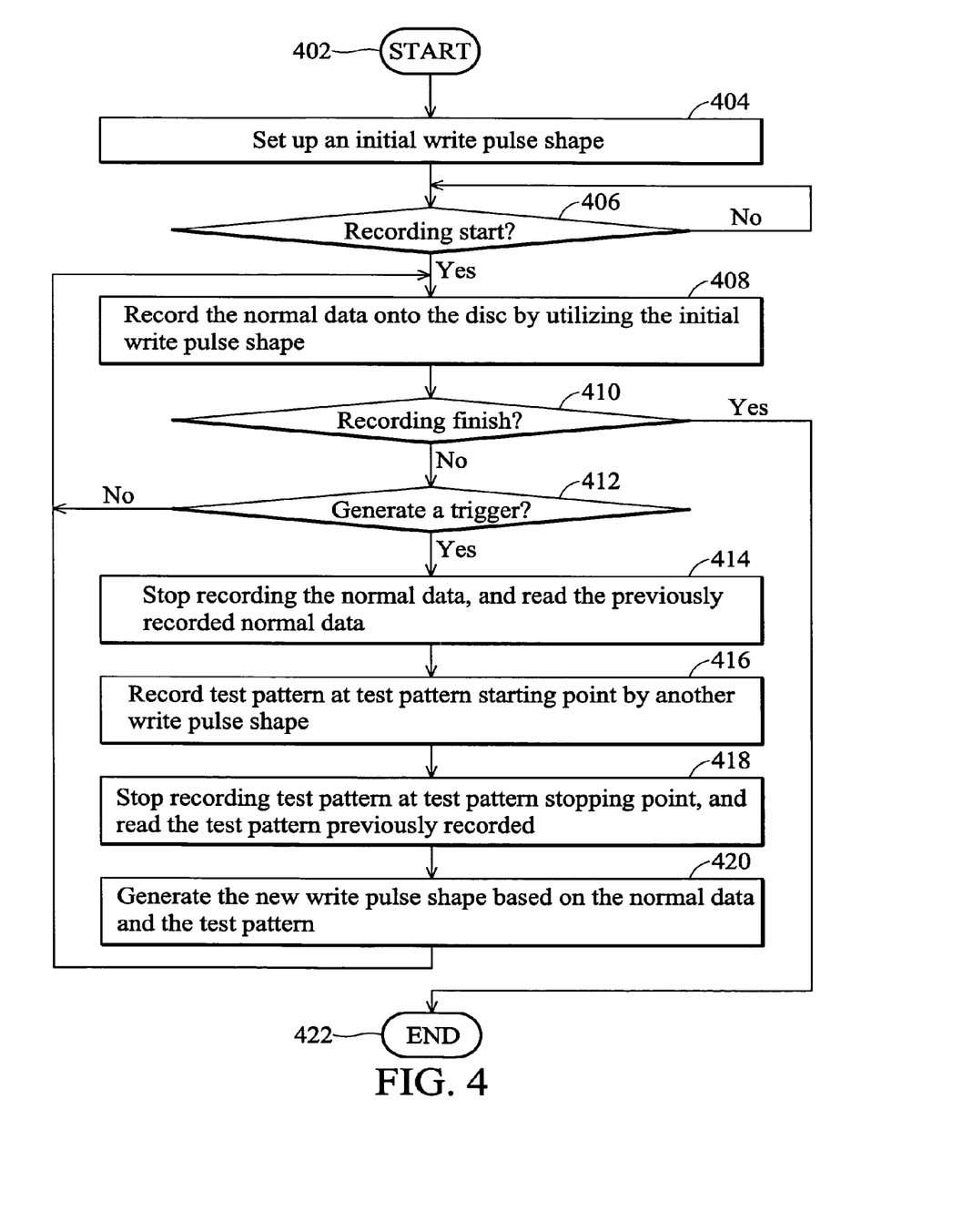
FIG. 4 is a flow chart of the laser control method according to the second embodiment of the invention.

Please refer to FIG. 4. FIG. 4 is a flow chart of the laser control method according to the second embodiment of the invention. The laser control method is applied to the optical system 100. The detailed description is shown as follows.

Step 402: Start.

Step 404: Set up an initial write pulse shape WpsA.

Step 406: If the recording has not yet started, step 406 is repeated; otherwise, proceed to step 408.

Step 408: Record the normal data 210 onto the disc 102 by utilizing the initial write pulse shape WpsA.

Step 410: If the recording is not finished, proceed to step 412; otherwise, go to step 422.

Step 412: Determine if the optical system 100 generates a trigger: If yes, proceed to step 414; otherwise go to step 408.

Step 414: Stop recording the normal data 210, and read the previously recorded normal data 210.

Step 416: Record test pattern 220 at test pattern starting point by another write pulse shape WpsB.

Step 418: Stop recording test pattern 220 at test pattern stopping point, and read the test pattern 220 previously recorded.

Step 420: Generate the new write pulse shape WpsC based on the normal data 210 and the test pattern 220.

Step 422: End.

Figure 5:
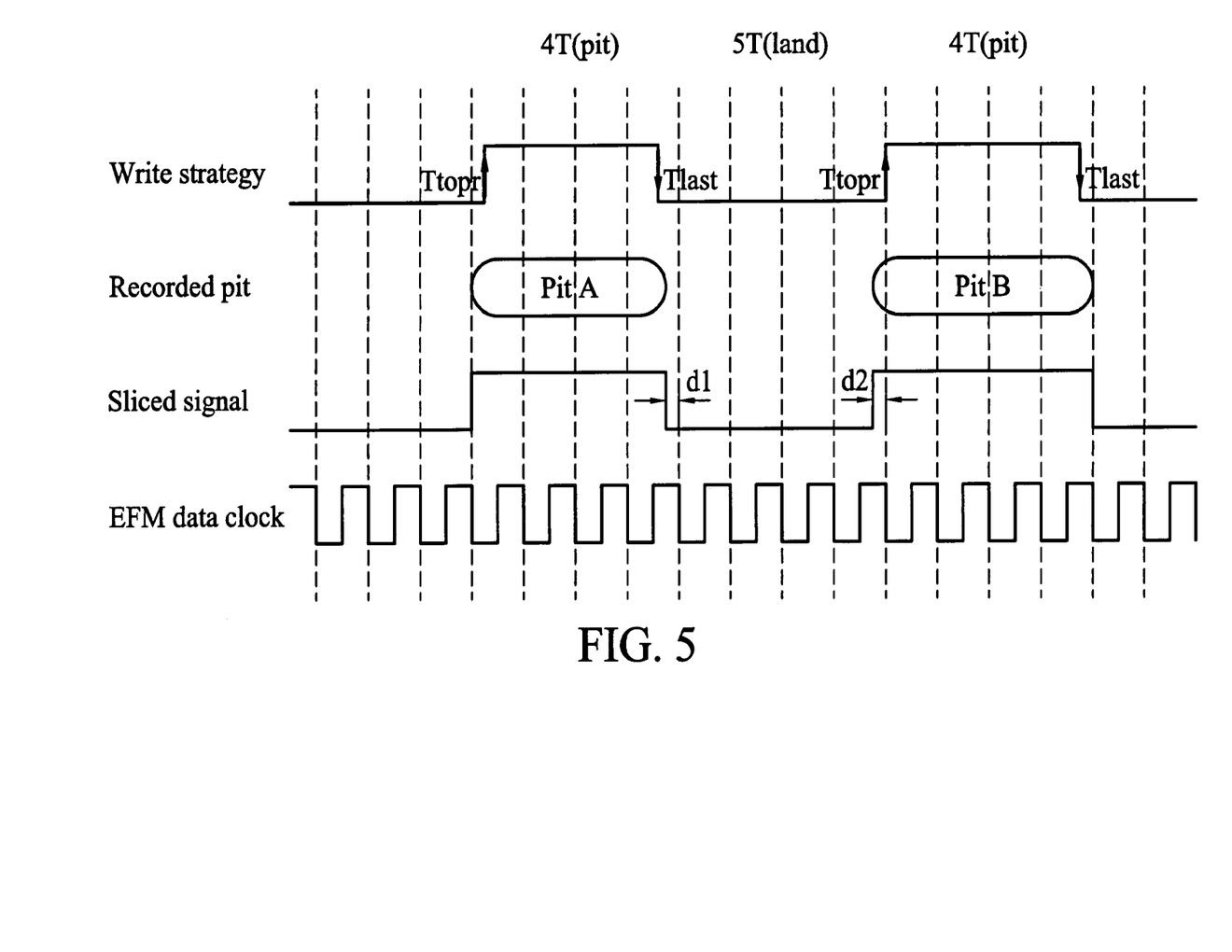
FIG. 5 shows a waveform diagram of write strategy determined from the write laser modulating circuit, a recorder pit recorded into the disc of FIG. 1, a sliced signal, and a EFM data clock output from the PLL according to the data-to-clock edge deviation method.
Figure 6A:
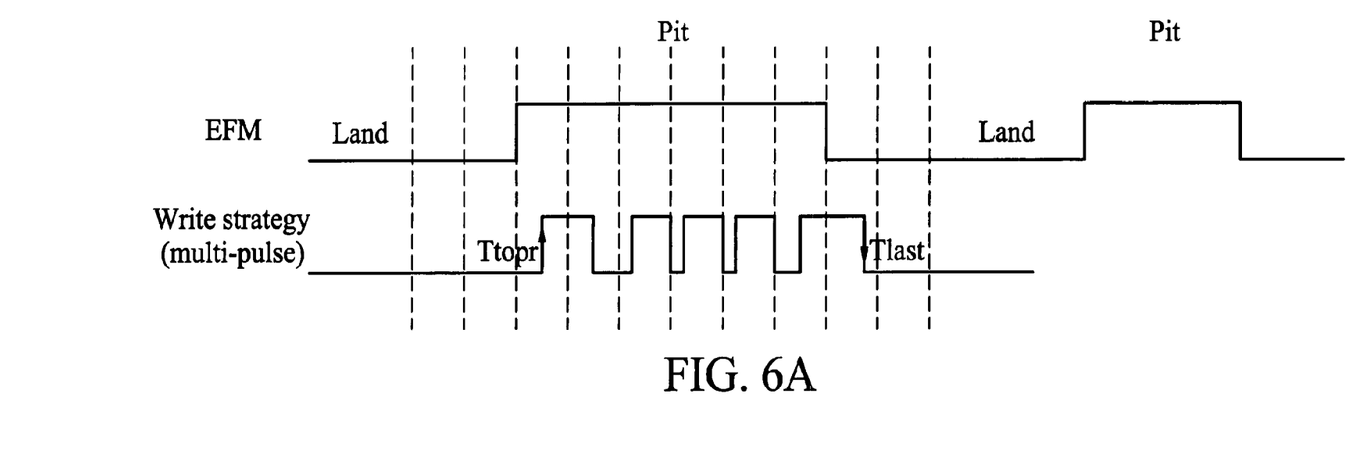
FIG. 6A and FIG. 6B show waveform diagrams of DVDR multi-pulse and single-pulse write strategies respectively according to a pit/land deviation.
Figure 6B:
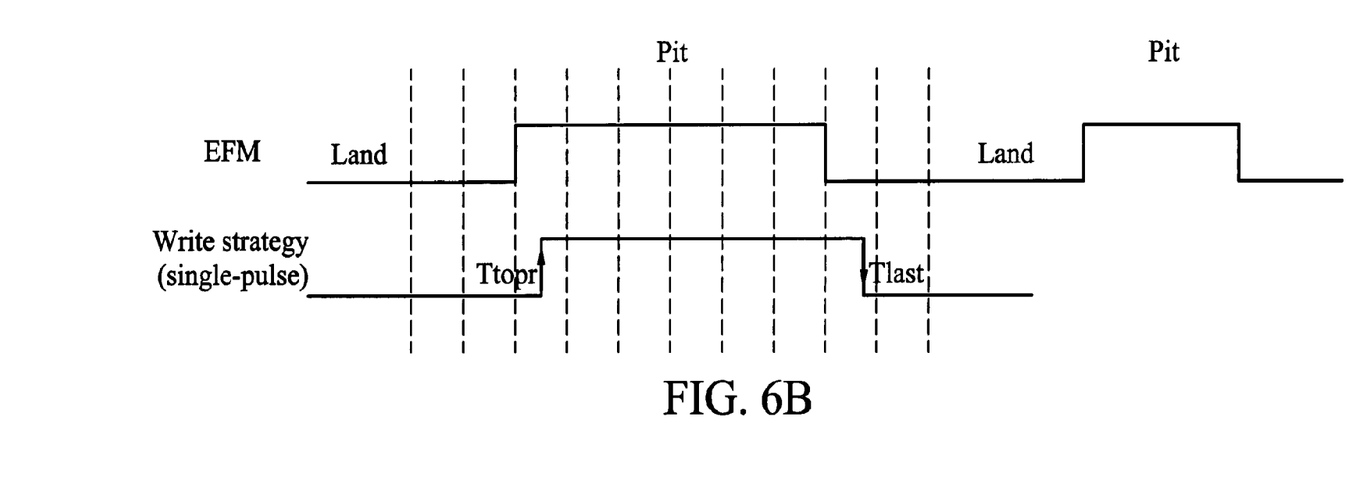
Figure 7:
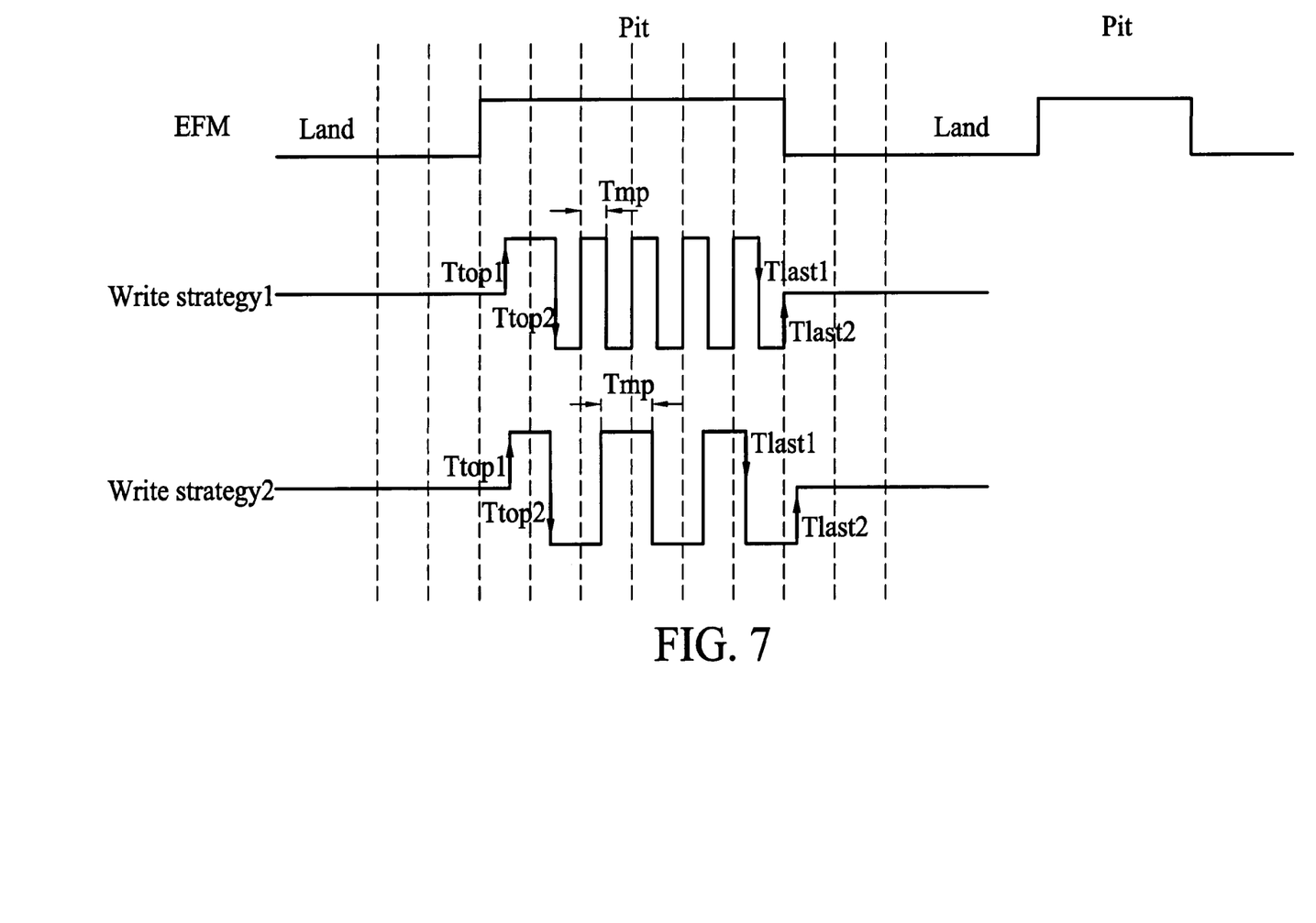
FIG. 7 shows a waveform diagram of DVDRW multi-pulse write strategy.

Further description of write pulse shape method is provided in the following. Please Refer to FIG. 5, FIG. 6A, FIG. 6B, and FIG. 7. For example, a data-to-clock edge deviation method (FIG. 5) and a Pit/Land length deviation method (FIG. 6A, FIG. 6B, FIG. 7) are described. FIG. 5 shows a waveform diagram of write strategy determined from the write laser modulating circuit 126 of FIG. 1, a recorder pit recorded onto the disc 102 of FIG. 1, a sliced signal, and a EFM data clock output from the PLL 108 of FIG. 1 according to the data-to-clock edge deviation method. By detecting the data-to-clock edge deviation (d1 or d2) from the data-to-clock edge deviation calculator 118 (FIG. 1), the write pulse shape times $T_{topr}$ and $T_{last}$ can be adjusted. FIG. 6A and FIG. 6B show waveform diagrams of DVDR multi-pulse and single-pulse write strategies respectively according to a pit/land deviation from the pit/land length deviation calculator 116 (FIG. 1). Similarly, FIG. 7 shows a waveform diagram of DVDRW multi-pulse write strategy.

Additionally, in some embodiments, the next coming normal data will start to be recorded at a test pattern starting point after generating the new laser power or write strategy; in some embodiments, the next coming normal data will start to be recorded at a test pattern stopping point after generating the new laser power or write strategy. In other words, the test pattern can be overwritten or not.

Compared with the related art, the laser control method adjusts laser power or write strategy (write pulse shape) to record the normal pattern according to both the previous recorded normal data and the recorded test pattern or according to the recorded test pattern.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A laser control method for dynamically adjusting laser output algorithm during recording data onto an optical disc, the laser control method comprising:
   recording normal user data onto the optical disc according to an initial laser output algorithm;
   recording a test pattern at a test pattern starting point according to a selected laser output algorithm;
   detecting at least one recording quality index from the normal user data and/or the test pattern recorded onto the optical disc; and
   determining an adaptive laser output algorithm to continually record the normal user data according to the recording quality index.

2. The laser control method of claim 1, wherein the step of recording the normal user data onto the disc further comprises: detecting an on-going quality index during recording and generating a trigger to record the test pattern if on-going quality index becomes worse than a predetermined value.

3. The laser control method of claim 2, wherein the on-going quality index, the first recording quality index, and the second recording quality are selected at least one from the group comprised: a asymmetry value, a bit error rate (BER), a jitter, a pit/land length deviation, or a data-to-clock edge deviation.

4. The laser control method of claim 1, wherein the laser output algorithm is the laser power.

5. The laser control method of claim 4, wherein an adaptive laser power is determined according to the following equation:

$$PwoC = PwoA + [(\text{IndexTarget} - \text{Index}A)/(\text{Index}B - \text{Index}A)] * (PwoB - PwoA)$$

wherein PwoA is an initial laser power, PwoB is a selected laser power, PwoC is the adaptive laser power, IndexA is a first recording quality index, IndexB is a second recording quality index, and IndexTarget is a target value of the recording quality.

6. The laser control method of claim 1, wherein the test pattern comprises a plurality of marks longer than 8T and a plurality of marks shorter than 5T.

7. The laser control method of claim 6, wherein a length of the test pattern is predetermined and the test pattern comprised a special pattern appeared repeatedly to meet the predetermined length.

8. The laser control method of claim 1, wherein the starting point for recording the test pattern is the pause point of the normal user data.

9. The laser control method of claim 1, wherein there is a gap between the starting point for recording the test pattern and the pause point of the normal user data.

10. The laser control method of claim 1, wherein the laser output algorithm is the write pulse shape.

11. A laser control apparatus for dynamically adjusting laser output algorithm to record data during recording a normal user data onto the optical disc, and a pick-up head (PUH) for generating laser to record the normal user data onto the optical disc according to the laser output algorithm, the laser control apparatus comprising:
   a detection circuit for detecting at least one recording quality index from the data recorded onto the optical disc; and
   a write laser modulating circuit for generating an initial laser output algorithm to the PUH to record the normal user data;
   generating a selected laser output algorithm to the PUH to record a test pattern at a test pattern starting point on the optical disc; and
   generating an adaptive laser output algorithm to continually record the normal user data according to a first recording quality index and/or a second recording quality index;
   wherein the first recording quality index is detected by the detection unit by reading back the recorded normal user data; and the second recording quality index is detected by the detection unit by reading back the test pattern.

12. The laser control apparatus of claim 11, wherein the detection unit detects an on-going quality index during recording and generating a trigger to record the test pattern if on-going quality index becomes worse than a predetermined value.

13. The laser control apparatus of claim 12, wherein the on-going quality index, the first recording quality index, and the second recording quality are selected at least one from the group comprised: a asymmetry value, a bit error rate (BER), a jitter, a pit/land length deviation, or a data-to-clock edge deviation.

14. The laser control apparatus of claim 11, wherein the laser output algorithm is the laser power.

15. The laser control apparatus of claim 14, wherein the write laser modulating circuit determines the adaptive laser power according to the following equation:

$$PwoC = PwoA + [(\text{IndexTarget} - \text{Index}A)/(\text{Index}B - \text{Index}A)] * (PwoB - PwoA)$$

wherein PwoA is the initial laser power, PwoB is the selected laser power, PwoC is the adaptive laser power, IndexA is the first recording quality index, IndexB is the second recording quality index, and IndexTarget is a target value of the recording quality.

16. The laser control apparatus of claim 11, wherein the laser output algorithm is the write pulse shape.

17. The laser control apparatus of claim 11, wherein the test pattern comprises a plurality of marks longer than 8T and a plurality of marks shorter than 5T.

18. The laser control apparatus of claim 17, wherein a length of the test pattern is predetermined and the test pattern comprised a special pattern appeared repeatedly to meet the predetermined length.

19. The laser control apparatus of claim 11, wherein the starting point for recording the test pattern is the pause point of the normal user data.

20. The laser control apparatus of claim 11, wherein there is a gap between the starting point for recording the test pattern and the pause point of the normal user data.

* * * * *